Aug. 21, 1962

J. PIPE 3,050,348

DRAWER SUSPENSION SLIDE

Filed Feb. 9, 1959

INVENTOR.
JOHN PIPE
BY Price & Heneveld
ATTORNEYS

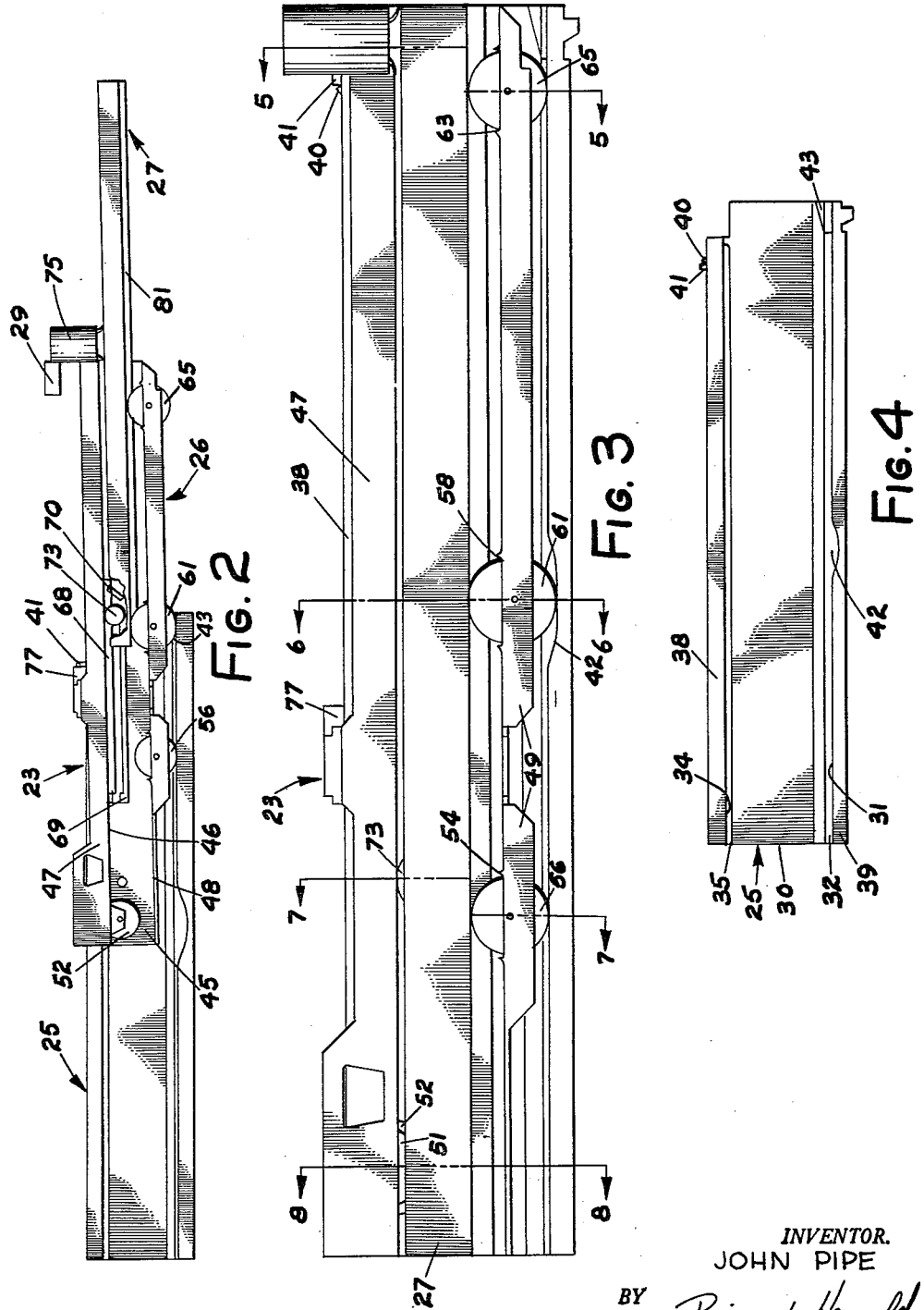

United States Patent Office 3,050,348
Patented Aug. 21, 1962

3,050,348
DRAWER SUSPENSION SLIDE
John Pipe, Grand Rapids, Mich., assignor to Steelcase, Inc., Grand Rapids, Mich., a corporation of Michigan
Filed Feb. 9, 1959, Ser. No. 791,923
5 Claims. (Cl. 308—3.8)

This invention relates to suspension slide mountings for file drawers and the like. More particularly, it relates to a telescopable suspension slide mounting wherein the intermediate extension rail or suspension member is mounted on disks.

Suspension slides for file drawers and the like are generally well-known. Usually, such comprise a stationary or case rail, a rail attached to, and travelable with, the drawer and an intermediate extension rail or suspension member between the first two mentioned rails. When the drawer is moved in or out, the extension rail automatically travels in the same direction as the drawer but at about half the speed while maintaining the drawer in a horizontal position. Usually, means are provided for minimizing frictional contact between the rails.

One such construction minimizes frictional contact by incorporating ball bearings between the rail members. The ball bearing type of construction has a disadvantage, however, in that very close tolerances are required. Unless the ball bearings are centered fairly precisely and accurately, the suspension slide will bind under use conditions. Obviously, such precision leads to high cost of labor and materials in constructing drawer suspension slides of this type.

An object of this invention is to develop a drawer suspension slide without ball bearings.

A primary object of this invention is to develop a drawer suspension slide in which frictional contact of the rail members is at a minimum.

A specific object of this invention is to provide a drawer suspension slide wherein the rail members thereof travel relative to each other on disks.

These and other objects which may appear as this specification proceeds are achieved by this invention which shall be described with reference to the drawings. A brief description of the drawings is as follows.

FIG. 2 is a side elevational view of a fully extended drawer suspension slide of FIG. 1.

FIG. 3 is a side elevation of a fully closed drawer suspension slide of FIG. 1.

FIG. 4 is a side elevation of the case rail member of the drawer suspension slide of FIGS. 2 and 3.

In general, the drawings disclose a drawer suspension slide in which the suspension or extension rail member is mounted on normally vertical disks. Horizontal frictional contact between the extension rail member and the case rail member and between the extension rail member and the drawer rail member is minimized by adapting the normally horizontal rail tracks on which the disks travel and the disks so that there is side bearing between said tracks and said disks.

Figure 1:
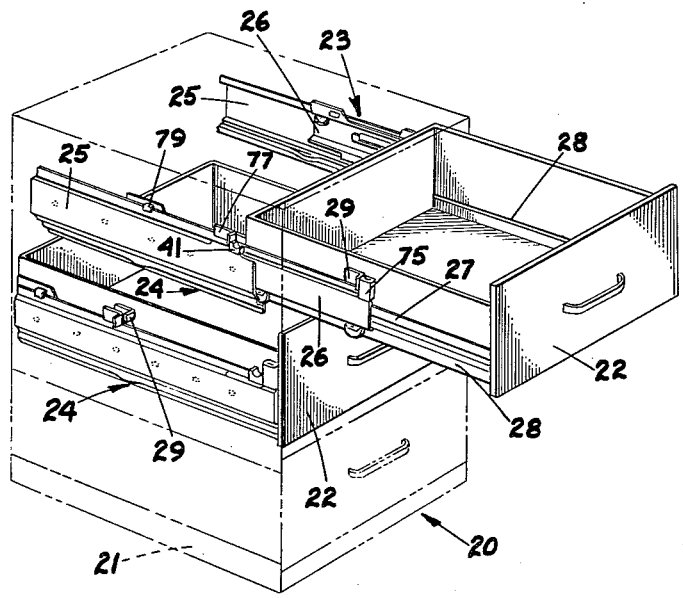
FIG. 1 is a perspective view of a file drawer cabinet having drawers mounted on drawer suspension slides in accordance with a preferred embodiment of this invention with one drawer being fully closed and another being fully extended.
Figure 5:
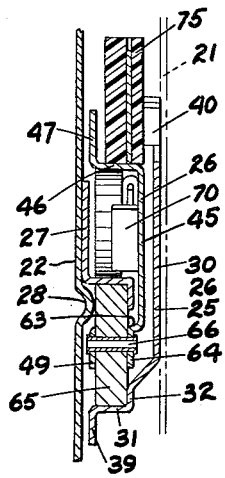
FIG. 5 is a sectional view taken along the lines 5—5 of FIG. 3.

Specifically, FIG. 1 of the drawings discloses a file cabinet 20. The cabinet 20 comprises a case 21 and one or more drawers 22. Associated with each drawer 22 is a right side suspension slide 23 and a left side suspension slide 24. The top drawer 22, it will be observed, is shown for purposes of illustration in the fully extended position while a drawer 22 underneath the top drawer is shown for purposes of illustration in a fully closed position.

Each suspension slide 23 and 24 is substantially alike except that one is a mirror image of the other. Consequently, for the sake of convenience, the suspension slide embodiment of FIG. 1 shall be described with reference to the right side suspension slide 23.

The right side suspension slide 23, shown in FIGS. 2 and 3, comprises a stationary or case rail member 25, an extension rail 26 and a drawer rail 27. Also involved are a spacer member 28 and a drawer check member 29.

The case rail 25 (FIGS. 4 and 6) has in cross-section the general form of a channel. It has a web portion 30 which is usually fastened as by weldments to the inside of the case 21 as shown in FIG. 1. At the bottom of the web portion 30 there is provided a bottom leg or track 31. The track 31, it will be observed, has a side wall 32. Along the top of the web portion 30 there is provided an upper leg or track 34 which likewise has a side wall 35. At the end of the upper track 34 there is provided an upwardly extending flange member 38. At the bottom of the lower track 31 there is provided a downwardly extending flange 39. Adjacent the front end of the case rail 25 the upper track 34 bends upwardly and backwardly (FIGS. 1–4) to form a clip 40. Inserted in the clip 40 is a bumper member 41 made out of a resilient material, such as a soft rubber and the like. Approximately midway of the ends of the case rail 25, the lower track 31 has a dip or concave section 42. See FIG. 4. The function of the concave section 42 of the bottom track 31 will be described hereinafter. At the front end of the case rail 25 it will be observed from FIGS. 3 and 4 that the bottom track 31 has a flared out section 43. The function of the flared out section 43 will be described hereinafter.

The extension rail 26 in cross-section has the general form of a channel (FIGS. 2 and 6–8). It has a channel web 45 disposed adjacent to, but out of contact with, the channel web 30 of the case rail 25. At the top of the web 45 the extension rail 26 is provided with a top leg 46 with an upwardly extending flange 47 at the end thereof. The upper leg 46 is positioned underneath, and out of contact with, the upper track 34 of the case rail 25. The upwardly extending flange member 47 of the suspension member 26 is arranged adjacent to the upwardly extending flange member 38 of the case rail. Here, there may be some horizontal contact but, in such event, it is preferred that the contact be limted to the top edge of the flange member 47. The upwardly extending flange portion 47 is also disposed adjacent to the side wall of the drawer 22. Here, however, no horizontal contact between the flange and the wall should be permitted. At the bottom of the web portion 45 of the extension rail 26 there is provided a normally horizontally disposed, outwardly extending leg 48 at the end of which there are downwardly extending flange means 49. The bottom leg 48 is positioned above, and out of contact with the plane of the bottom track 31 of the case rail 25.

The extension rail 26 is mounted on the case rail 25 by means of normally, vertically disposed, rotatable disks disposed on the normally, horizontally disposed, case rail tracks 31 and 34. See FIGS. 2 and 3.

Figures 6, 7, 8, 9:
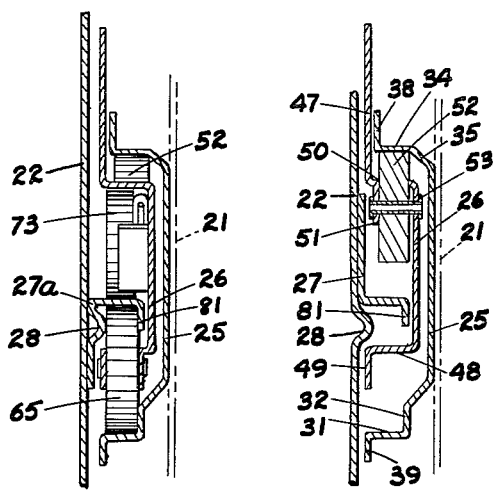
FIG. 6 is a sectional view taken along the lines 6—6 of FIG. 3.
FIG. 7 is a sectional view taken along the lines 7—7 of FIG. 3.
FIG. 8 is a sectional view taken along the lines 8—8 of FIG. 3.
FIG. 9 is a sectional view of the front portion at a drawer suspension slide showing a modification of the drawer rail member.

With reference to the upper track 34, the extension rail 26 has a longitudinal opening 50 in the end region of the upper leg 46. Disposed through the opening is a rotatable disk 52 rotatably mounted on a horizontally disposed shaft 53. As shown in FIGS. 2 and 8, one end of the shaft 53 is secured to the web portion 45 while the other end of the shaft is mounted on a downwardly extending tab portion 51 of the leg 46. As shown in FIG. 8, the circumferential periphery of the disk 52 is in contact with the upper track 34 of the case rail 25. Moreover, as shown in FIG. 8, the side wall portion 35 of the upper track 34 bears against the side edge of the disk 52.

With reference to the lower track 31, there are provided three disks. One disk 56 is disposed frontwardly of the upper disk 52, one disk 61 is disposed midway of the ends of the extension rail 26 and one disk 65 is disposed adjacent the front end of the extension rail. To accomplish this, the lower leg 48 of the extension rail 26 is provided with a longitudinal opening 54 generally frontwardly of the upper disk 52. Positioned in the opening 54 is the rear rotatable bottom disk 56 mounted on a shaft 57. One end of the shaft 57 is secured to a flange means 49 while the other end of the shaft 57 is secured to a downwardly extending tab portion 91. Midway of the ends of the extension rail 26 there is provided an intermediate longitudinal opening 58 in the lower leg 48. Disposed in the intermediate opening 58 is the intermediate disk 61. The disk 61 is rotatably mounted on a shaft 62, one end of which is secured to downwardly extending flange means 49, the other end of which is secured to a downwardly extending tab portion 60. In the front end region of the lower leg 48 there is provided a longitudinally extending front opening 63 with the front disk 65 disposed in the opening. Similarly, the disk 65 is rotatably mounted on a shaft 66 secured to the downwardly extending flange 49 and a downwardly extending tab 64.

When the suspension slide 23 is in closed position, the circumferential peripheries of each of the bottom disks 56, 61 and 65 are in contact with the bottom track 31 of the case rail 25. In such position (FIG. 3) the intermediate bottom disk 61 is seated in the concave section 42 of the bottom track 31. For this reason the outside diameter of the intermediate disk 61 is larger than the outside diameter of the rear bottom disk 56 and the front bottom disk 65. In order to enable the disk 61 to drop into the concave section 42 the inside diameter of the hub of the intermediate bottom disk 61 is larger (FIG. 6), preferably by a distance corresponding to the depth of the concave section 42, than the outside diameter of its shaft 62 in the hub region. The inside diameter of the hub of the rear bottom disk 56 (FIG. 7) is substantially larger, but preferably not as great as in the case of disk 61, than the outside diameter of its shaft 57 in the hub region. This allows the rear bottom disk 56 to drop into the concave section 42 when the drawer is partially withdrawn. The intermediate extension slide 26 is free to move vertically to compensate for the differences in diameter of the disks 56, 61, and 65 and allow free movement of the drawer. In the case of the front bottom disk 65 and the top disk 52, the hub diameters are preferably only sufficiently greater than the shaft diameters to permit free rotation of the respective disks on their shafts. To assure this the hubs of these two disks 65 and 52 are provided with, for example, nylon bushings.

Moreover, each of the bottom disks 65, 56 and 61 when disposed on the bottom track 31 not only contact the horizontal portion of the bottom track 31 but also bear sidewise against the side wall portion 32 thereof.

The extension rail 26 also comprises an auxiliary disk assembly. This assembly comprises a race 68 fastened to the web portion 45 and extending along the web portion 45 from a point rearwardly of the rear bottom disk 56 to a point frontwardly of the intermediate bottom disk 61. The race 68 is provided with a rear detent means 69 and at the front end thereof a tab detent means 70. Slidably mounted on the race 68 is an auxiliary disk 73. The slide mounting of the disk 73 comprises a round retention plate 71 disposed within the race 68 and having a normally horizontal shaft 72 on which the auxiliary disk 73 is secured.

The extension rail 26 also comprises at the front end thereof a front bumper member 75. This member is formed by an upward extension of the web portion 45 and a resilient shield inserted on said upper extension.

Midway between the rear bottom disk 56 and the intermediate bottom disk 61 and secured to an offset portion of the upwardly extending flange 47 of the extension rail 26 is an overlapping check member 77. The check member 77 is secured to the flange 47 and overlaps the upper flange member 38 of the case rail 25. The check member 77 is in the form of an L-bar with the flat surface of the leg of the L facing the bumper 41 of the case rail 25, and in horizontal alignment therewith. The check in combination with the bumper member 41 of the case rail 25 functions to limit the member 77 to the case rail 25. In this regard, it will be observed in FIG. 2 that at the forwardmost limit of travel of the extension rail 26 relative to the case rail 25, the intermediate bottom disk 61 is positioned on the bottom track 31 in the flared out section 43 thereof. The check member 77 also functions as a means for retaining the extension rail 26 in mounted position on the case rail 25, when the drawer 22 and accompanying drawer rail 27 and spacer means 28 is fully extended and when such is dismounted from the cabinet 20.

The extension rail 26 also comprises at the rear end thereof a guide member 79. As can be seen by FIG. 7, this guide member is in the form of a tab extending laterally and then downwardly from the upwardly extending flange 47 over the upper flange member 38 of the case rail 25. The guide member 79 also functions to retain the extension rail 26 in the case rail 25, when the drawer 22 is dismounted and when such is in fully extended position.

The drawer rail 27 in the embodiment shown in FIGS. 1–8 is in the form of a Z-bar. One leg of the Z is fastened as by way of weldments to the side wall of the drawer 22. In position the web of the Z-bar is horizontally disposed on top of the bottom disks 56, 61 and 65. The auxilary disk 73, it will be seen in FIGS. 2 and 7 is in contact with the top surface of the web. The other leg 81 of the Z-bar is disposed adjacent to the web 45 of the extension rail 26 and between the bottom disks. However, this leg 81 is not in contact with the web 45. On the other hand, it preferably is in side bearing with the bottom disks 56, 61 and 65.

The spacer means 28 is disposed below the drawer rail 27. It is adapted to bear sidewise against the upper portions of the bottom disks 56, 61 and 65. As shown in FIGS. 1–8, the spacer means 28 is in the form of a longitudinally extending, protrusion of the side wall of the drawer 22.

In the modification illustrated in FIG. 9, the spacer means 28 is an integral part of the drawer rail 27a. In this embodiment, the drawer rail 27a is in the general form of an angle bar. The outwardly extending leg of the angle bar corresponds to the web portion of the Z bar form of the drawer rail. Although not necessary, there may preferably be provided a normally downwardly extending flange 81 at the end of the outwardly extending leg of the angle bar corresponding to the downwardly extending leg 81 of the Z. The protrusion 28 is formed by an outward bend in the leg of the angle bar 27a fastened to the drawer 22.

In either embodiment, the spacer means 28 functions to localize horizontal frictional contact of the drawer 22 with the suspension slide 23 to the spacer means 28 and the sides of the bottom disks. It also functions to assist in establishing and maintaining the side bearing of the disks against the upper and lower tracks of the case rail 25, and the outer flange or leg 81 of the drawer rails 27 or 27a.

The drawer check 29 is in the form of an L bar. It is mounted on the side wall of the drawer 22 with the stem of the L normally vertically disposed and fastened thereto as by weldment. The leg of the L faces forward and is in horizontal alignment with the front bumper 75. Together, the drawer check 29 and the front bumper 75 function to limit the forward travel of the drawer 22 relative to the extension rail 26. Preferably the limit of forward travel of the drawer 22 relative to the extension rail 26 should be where the back end of the drawer rail 27 is adjacent the intermediate bottom disk 61 and still in contact therewith (FIG. 2). Relative to the case rail 25 and thus to the cabinet 20, the limit of forward travel of the drawer 22 is preferably at least to the point where the back end of the drawer 22 is in the region of the front of the cabinet 20.

To open the drawer suspension slide 23, one need only to pull the drawer 22 and thus the drawer rail 27 out of closed positon until the extension rail check member 77 and the bumper member 41 contact each other and the drawer check 29 and front bumper 75 contact one another, see FIG. 2. The forward travel of the drawer rail 27 causes the auxiliary disk 73 to travel forwardly in the race 68 until it is stopped by the front tab detent 70 or until the drawer check 29 strikes the front bumper 75, which ever first occurs. In either case, when the drawer check 29 strikes the front bumper 75, the rear portion of the drawer rail 27 will be supported on the front bottom disk 65 and preferably on the intermediate bottom disk 61. The auxiliary disk 73 bearing against the top of the drawer rail 27 prevents the drawer rail 27 and thus the drawer 22 from toppling over under the weight of the drawer 22 and drawer rail 27.

To close the drawer suspension slide 23 and thus the drawer 22, one need only to push the drawer 22 and thus the drawer rail 27 until the extension rail 26 and drawer rail 27 are in closed position as shown in FIG. 3. As already mentioned, in the closed position, the intermediate disk 61 is seated in the concave section 42 of the bottom track 31. This arrangement enables the drawer 22 to be slammed shut without immediately popping out. The flared-out section 42 of the lower track 31 functions to guide the front lower disk 65 into the lower track 31 even if there is a minor amount of horizontal sway of the drawer 22 during the closing thereof.

The drawer suspension slides 23 and 24 have a feature of advantage in that a drawer 22 mounted thereon can be removed when desired and reinstalled when desired. To remove a drawer 22 from the cabinet 20, the drawer is pulled out to the limits of travel, as determined by the extension rail check member 77 and bumper member 41 combination and the drawer check 29 and front bumper 75 combination. The front end of the drawer 22 is then raised until the drawer check 29 clears the top of the front bumper 75. The drawer 22 is finally pulled further out until the drawer rail 27 clears the front disk 65 of each extension rail 26. To reinstall the drawer 22, all that need be done is to seat the back end of each drawer rail 27 of the drawer 22 on the respective front disks 65 of the extension rail. The drawer is then pushed backwardly until the drawer check 29 reaches the front bumper 75, lifted until the drawer check 29 clears the top of the front bumper 75, pushed forwardly and then lowered downwardly.

Under normal use conditions, regardless of whether the drawer 22 be empty, partially loaded or fully loaded, there is substantially no frictional contact between the case rail 25 and the extension rail 26 and no frictional contact between the extension rail 26 and drawer rail 27 of each suspension slide 23 and 24. The disks, the side walls 32 and 35 of the case rail tracks, the flange 81 of the drawer rail and the spacer member 28 cooperate to establish and maintain the rail members of each suspension slide in spaced apart relationship. Moreover, the minimal horizontal frictional contact that is involved in the suspension slides 23 and 24 is confined to these structural members, the abutting surfaces of which are small in area and travel with a radial motion relative to each other which further reduces horizontal frictional contact.

Thus, there is provided a drawer suspension slide of sturdy and rugged construction. The parts of the drawer suspension slide need not be manufactured with any great precision. A minimum number of working parts are involved. Most importantly, the drawer suspension slide operates smoothly and quietly without binding and with only a minimum of horizontal frictional contact in the slide suspension.

As this invention may be embodied in several forms without departing from the spirit or essential characteristics thereof, the embodiments just described are thereof illustrative and not restrictive, since the scope of the invention is defined by the appended claims rather than by the description preceding them, and all changes that fall within the metes and bounds of the claims, or that form their functional as well as conjointly cooperative equivalents, are therefore intended to be embraced by those claims.

I claim:

1. An extensible drawer slide assembly adapted to operate in a horizontal position, comprising: a pair of case rails; pull drawer means including a drawer and a pair of opposite drawer rails adjacent said case rails; a pair of intermediate extension rails positioned between the respective case rails and drawer rails; first roller disk means between each of said case rails and the respective intermediate rails, and a second roller disk means between each of said intermediate rails and the respective drawer rails; each of said disk means being vertically disposed to rotate in the direction of said rails; said drawer rails having roller disk bearing surfaces corresponding in shape to the periphery of said first roller disk means and riding thereon; and elongated, horizontal, deformed bearing surface protuberances extending out of said drawer means, spaced from said bearing surfaces, and engaging the inner side walls of said first disk means to reduce frictional contact of said drawer means with said case rails and intermediate rails.

2. The assembly in claim 1 wherein said case rails each have an elongated deformed wall portion projecting into contact with the outer side walls of said first disk means, thereby cooperating with said bearing surface protuberances to stabilize said drawer means as well as reducing frictional contact.

3. The assembly in claim 1 wherein said elongated bearing surface protuberances are bent portions of said drawer rails.

4. An extensible drawer slide means adapted to be fixed in a horizontal position comprising: a case rail member, a drawer rail member and an intermediate extension rail member slidably mounted therebetween; said case rail member having a lower flange extending in the direction toward said drawer rail member; said drawer rail member having a support flange extending toward said case rail; disk means between the case rail flange and the intermediate extension rail and between the drawer rail flange and the intermediate rail, said disk means being disposed on an axis normal to said case rail and being operatively associated with said case rail member, drawer rail member and intermediate rail member so that said intermediate rail member is supported on said case rail and said drawer member is supported on said intermediate extension rail member with relative extendible movement therebetween; said support flange of said drawer rail surface corresponding in shape to and riding on the periphery of said disk means between said case rail and intermediate rail; and an elongated horizontal bearing surface extending from said drawer rail, spaced from the said surface of said drawer rail support flange, protruding in a direction away from said drawer rail member toward said intermediate extension rail member and engaging said disk means thereby minimizing the frictional contact between said drawer rail member and said intermediate extension rail member.

5. An extensible drawer slide assembly adapted to operate in a horizontal position, comprising: a pair of case rails; pull drawer means including a drawer and a pair of opposite drawer rails adjacent said case rails; a pair of intermediate extension rails positioned between the respective case rails and drawer rails; first roller disk means between each of said case rails and the respective intermediate rails, and a second roller disk means between each of said intermediate rails and the respective drawer rails; each of said disk means being vertically disposed to rotate in the direction of said rails; and elongated, horizontal, deformed bearing surface protuberances formed out of bent portions of said drawer and extending out of said drawer means into contact with the inner side walls of said first disk means to reduce frictional contact of said drawer means with said case rails and intermediate rails.

References Cited in the file of this patent

UNITED STATES PATENTS

| | | |
|---|---|---|
| 1,189,580 | Kenyon | July 4, 1916 |
| 1,981,246 | Pipe | Nov. 20, 1934 |
| 2,561,163 | Wolters | July 17, 1951 |
| 2,565,784 | Sheean | Aug. 28, 1951 |

FOREIGN PATENTS

| | | |
|---|---|---|
| 345,539 | Great Britain | Mar. 26, 1931 |
| 239,916 | Switzerland | Mar. 16, 1946 |
| 245,624 | Switzerland | Aug. 1, 1947 |